(12) United States Patent
Farhad (10) Patent No.: US 10,788,445 B2
(45) Date of Patent: Sep. 29, 2020

(54) POLYMER ELECTROLYTE MEMBRANE FUEL CELL (PEMFC) SENSOR

(71) Applicant: Siamak Farhad, Copley, OH (US)

(72) Inventor: Siamak Farhad, Copley, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 179 days.

(21) Appl. No.: 15/924,902

(22) Filed: Mar. 19, 2018

(65) Prior Publication Data

US 2018/0266985 A1   Sep. 20, 2018

Related U.S. Application Data

(60) Provisional application No. 62/472,770, filed on Mar. 17, 2017.

(51) Int. Cl.
*G01N 27/404* (2006.01)
*G01N 27/407* (2006.01)

(52) U.S. Cl.
CPC ....... *G01N 27/4075* (2013.01); *G01N 27/404* (2013.01); *G01N 27/4074* (2013.01)

(58) Field of Classification Search
CPC ............. G01N 27/404; G01N 27/4074; G01N 27/4075
See application file for complete search history.

(56) References Cited

U.S. PATENT DOCUMENTS

| | | | |
|---|---|---|---|
| 2004/0058203 A1* | 3/2004 | Priestnall | H01M 8/0271 429/447 |
| 2014/0170525 A1* | 6/2014 | Hong | H01M 8/1004 429/482 |
| 2015/0180365 A1* | 6/2015 | Park | B60L 3/0053 307/31 |

* cited by examiner

*Primary Examiner* — Brittany L Raymond
(74) *Attorney, Agent, or Firm* — Renner Kenner Greive Bobak Taylor & Weber (57) ABSTRACT

A polymer electrolyte membrane fuel cell (PEMFC) sensor includes an anode and a cathode with a polymer electrolyte disposed therebetween. The anode and cathode are configured with asymmetric catalyst loadings, such that the catalyst loading on the cathode is lower than that of the anode. Accordingly, due to the reduction of the amount of catalyst utilized, the cost of fabricating the sensor is substantially reduced.

14 Claims, 7 Drawing Sheets

FIG. 3C $$\text{area (charge density)} = \int_o^x ae^{-bt}\,dt = \frac{a}{b}$$

POLYMER ELECTROLYTE MEMBRANE FUEL CELL (PEMFC) SENSOR

CROSS-REFERENCE TO RELATED APPLICATION

This application claims the benefit of U.S. Provisional Application No. 62/472,770 filed Mar. 17, 2017, the contents of which are incorporated herein by reference.

TECHNICAL FIELD

The embodiments disclosed herein relate to electrochemical sensors. In particular, the embodiments disclosed herein relate to electrochemical sensors utilizing a polymer electrolyte. More particularly, the embodiments disclosed herein relate to electrochemical sensors formed as polymer electrolyte membrane fuel cells (PEMFC) that utilize electrodes having variable catalyst loading.

BACKGROUND

Accurate, rapid and low-cost detection and quantification of an analyte gas is required in many applications, such as in the analysis of ethanol gas or acetone gas or hydrogen chloride gas concentration in human breath, the analysis of foods and beverages, the analysis of gases in oil, gas and petrochemical industries, and in agricultural and environmental analyses. For example, an ethanol gas concentration measurement of a person's exhaled breath is essential for the determination of a blood alcohol concentration to identify drunk drivers. Another example is the measurement of acetone in a person's exhaled breath for diabetic persons. While technologies exist to measure blood alcohol concentration—such as gas chromatography, infrared, and semiconductor techniques—fuel cell-based sensors have been more popular for performing breath ethanol measurements due to their superior accuracy, linearity, sensitivity and selectivity, portable field-based size, moderate-cost, and rapid response time allowing the assessment of vehicle drivers to be expedited. Although current fuel cell sensors provide superior performance to measure ethanol gas concentration over other technologies, such fuel-cell sensor technology has not been improved for some time. That is, while significant progress has been made in the areas of nano-technology, catalysts, and fuel cells in general, currently available fuel cell sensors have not been similarly advanced. In particular, the embodiments of the sensor disclosed herein makes advances in the efficient use of expensive catalysts in the electrodes of fuel cell sensors, and, separately and distinctly, provides fuel cell sensors that avoid the use of liquid phosphoric and sulfuric acid electrolytes, which pose a serious safety issue to users of many fuel cell sensors. Given the high cost and safety concerns of the prior art fuel cell sensors, their adoption and use has been limited, and the embodiments of the sensor disclosed herein will improve their chances of being employed safely and cost effectively.

SUMMARY

Therefore, it is one aspect of the various embodiments disclosed herein to provide a polymer electrolyte membrane fuel cell (PEMFC) sensor that utilizes asymmetric catalyst loadings, such that the catalyst loading on the cathode is lower than that of the anode, so as to reduce the overall amount of catalyst needed by the sensor, resulting in a reduced overall cost of the sensor.

It is another aspect of the various embodiments disclosed herein to provide a polymer electrolyte membrane fuel cell (PEMFC) sensor that includes an anode; a cathode that is configured to react with air; and a polymer electrolyte disposed between the anode and cathode, wherein the anode and cathode have a variable loading of a catalyst thereon.

It is yet another aspect of the various embodiments disclosed herein to provide an electrochemical sensing device that includes a PEMFC sensor that includes an anode; a cathode that is configured to react with air; and a polymer electrolyte that is disposed between the anode and cathode, wherein the anode and cathode have a variable loading of a catalyst thereon; and wherein the electrochemical sensing device includes a chamber body that has a cavity disposed therein; a first port that is in communication with the cavity, with the first port configured to receive the air therethrough; and a second port in communication with the cavity, the second port being configured to receive an analyte therethrough; wherein the PEMFC is positioned within the cavity, such that the air and the analyte are separated within the cavity.

It is still another aspect of the various embodiments disclosed herein to provide a method of forming a polymer electrolyte membrane fuel cell (PEMFC) sensor, that includes the steps of providing an electrolyte, an anode, and a cathode, wherein the anode and the cathode have a variable loading of catalyst thereon; and hot pressing the electrolyte, the anode and the cathode together to form the PEMFC sensor.

BRIEF DESCRIPTION OF THE DRAWINGS

These and other features and advantages of the various embodiments disclosed herein will become better understood with regard to the following description, appended claims, and accompanying drawings wherein:

DETAILED DESCRIPTION

Figure 1:
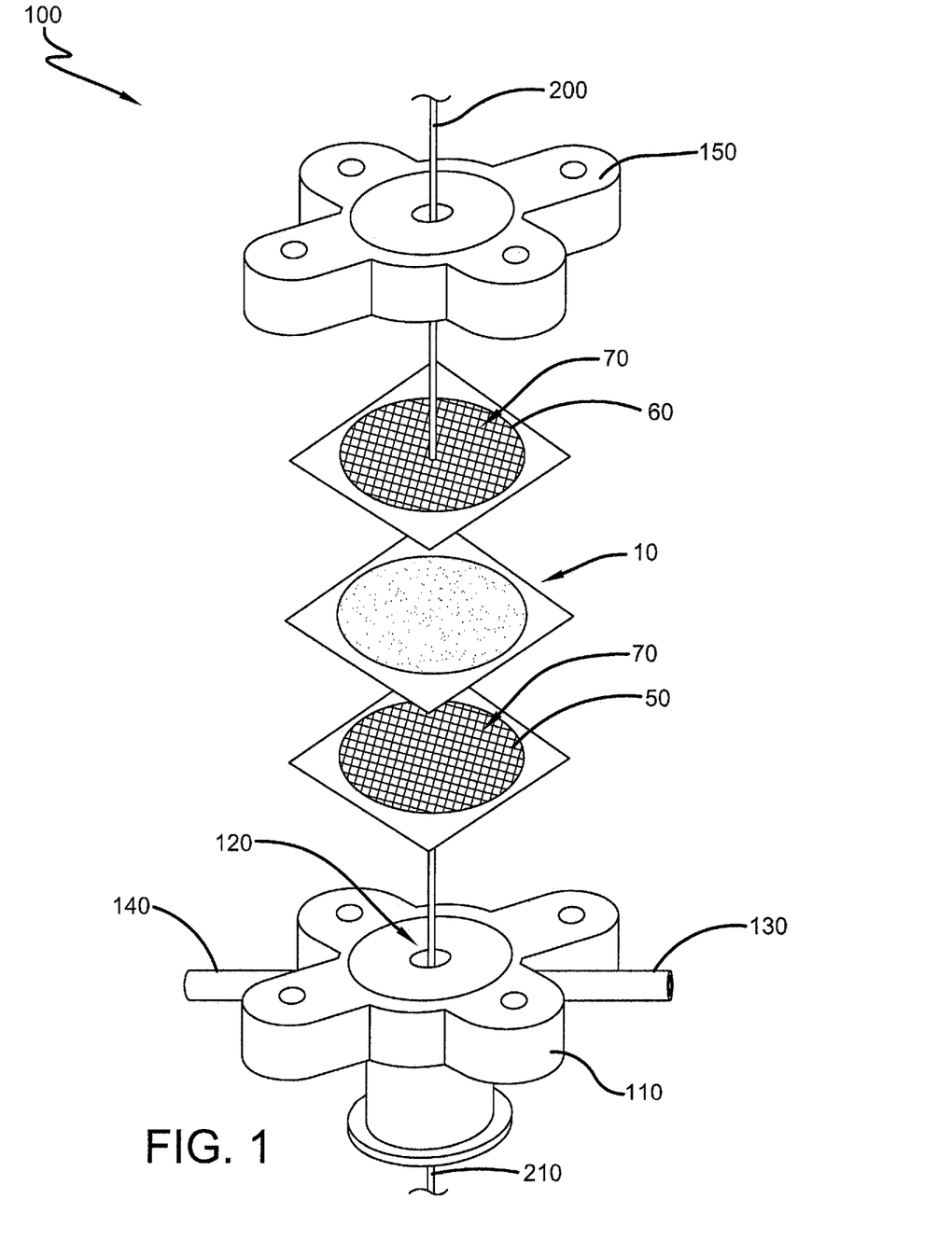
FIG. 1 is an exploded view of a polymer electrolyte membrane fuel cell (PEMFC) sensor in accordance with one or more embodiments disclosed herein.
Figure 2:
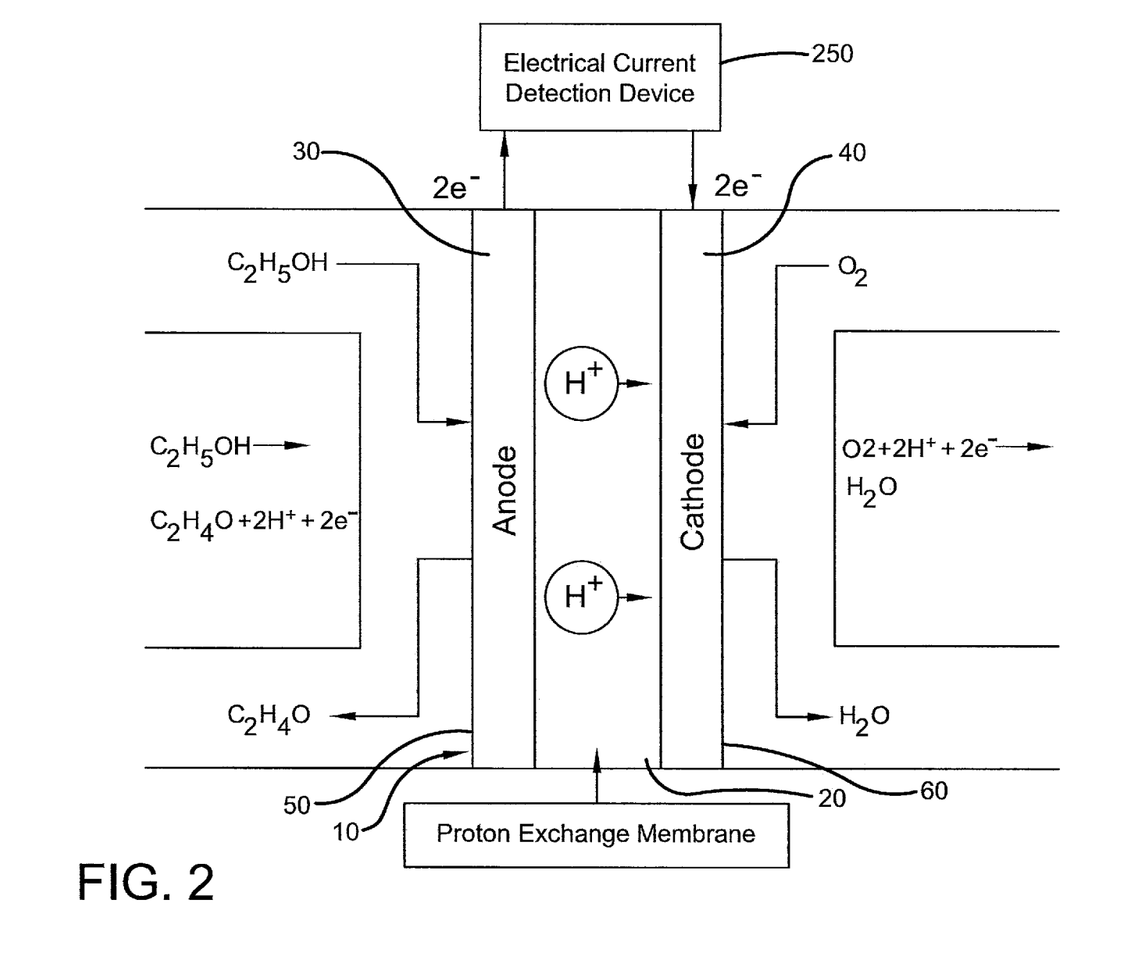
FIG. 2 is a schematic cross-sectional view of an example PEMFC sensor functioning to sense ethanol as an analyte gas, for example, in human breath.

A polymer electrolyte membrane fuel cell (PEMFC) sensor, hereinafter sensor 10, is shown in FIGS. 1 and 2. In particular, the sensor 10 is formed as a laminated or layered structure having a polymer electrolyte layer 20 that is disposed between an anode layer 30 and a cathode layer 40 to form the sensor 10. To facilitate the flow of electrical current from the sensor 10 during its operation, an anode current collector layer 50 is positioned in electrical communication with the anode layer 30 and a cathode current collector layer 60 is positioned in electrical communication with the cathode layer 40. It should be appreciated that the anode layer 30, the electrolyte layer 20, and the cathode layer 40 are directly adjacent layers that are in physical contact with each other as generally shown in the schematic of FIG. 2. During operation of the sensor 10 oxygen of ambient air interacts with the cathode layer 40, while an analyte gas or liquid that is being investigated/analyzed (or detected/quantified) interacts with the cathode layer 40. The analyte gas, under the influence of the catalyst, produced electrons at the anode layer 30, while the oxygen in the ambient air at the cathode forms water molecules with those generated electrons. In the specific example of FIG. 2, the analyte gas is ethanol, which produced 2 electrons at the anode—appropriate chemical reactions are shown in the schematic of FIG. 2. The electrons generate an electrical current produced by the sensor 10 that flows from the anode 30 to the cathode 40. That is, electrical current generated by the anode layer 30 flows from the current collector layer 50 to a suitable electrical current detector (to be discussed), which measures one or more parameters, such as magnitude of the electrical current produced, in order to identify the concentration of the analyte being investigated, whereupon the electrical current returns to the cathode current collector 60 and back to the cathode 40.

The analyte can be virtually any gas or liquid commonly analyzed in the art. Non-limiting examples include acetic acid, acetone, ammonia, benzene, butadiene, carbon dioxide, chlorine, ethanol, ethylene oxide, formaldehyde, hydrochloric acid, hydrogen chloride, hydrogen peroxide, hydrogen sulphide, iso-propanol, mercaptan, methanol, methylene chloride, MTBE, Nitrogen Dioxide, nitrous gases, oxygen, ozone, perchloroethylene, petroleum hydrocarbons, phosgene, phosphine, propane, styrene, sulfur dioxide, toluene, training chip, trichloroethylene, vinyl chloride, and xylene.

The polymer electrolyte layer of the sensor 10 can be virtually any solid polymer electrolyte. In particular embodiments, the solid polymer electrolyte is selected from fluoropolymer (PFSA) Nafion™ (The Chemours Company, a DuPont product) While Nafion™ is an ionomer with a perfluorinated backbone like Teflon, there are many other structural motifs used to make ionomers for proton-exchange membranes. Many use polyaromatic polymers, while others use partially fluorinated polymers.

In particular embodiments, the solid polymer electrolyte is a sulfonated tetrafluoroethylene based fluoropolymer-copolymer, such as Nafion™ or a Titania-Nafion™ composite material. In some embodiments, Nafion™ is provided as one or more sheets that are activated by the following steps: 1) immersion of the one or more Nafion™ sheets in boiling 3% $H_2O_2$ aqueous solution for about 1 hour; 2) rinsing of the one or more Nafion™ sheets with distilled de-ionized (DDI) water 1 or more times, such as 3, and boil the one or more sheets in DDI water for about 1 hour; 3) immersing the one or more Nafion™ sheets in boiling 1 mol/L $H_2SO_4$ aqueous solution for 1 hour; and 4) rinsing the one or more sheets with DDI water 1 or more times, such as 3, and keep the one or more sheets of Nafion™ in the DDI water until fabrication of the sensor.

There are various types of Nafion™ that can be employed, including Nafion™ 115, Nafion™ 117, Nafion™ 211, Nafion™ 212, Nafion™ XL, Nafion™ 1110, Nafion™ 438.

The anode layer 30 and the cathode layer 40 are electrically conductive, but are electrically isolated from each other by the electrolyte layer 20. In some embodiments, the anode and cathode layers 30, 40 are gas diffusion electrodes (GDE). The electrodes may be chosen from virtually any suitable gas diffusion electrode given the analyte of interest, the gas diffusion electrode having any suitable catalyst loaded thereon. In some embodiments, the gas diffusion electrodes may be formed of Vulcan carbon-supported catalyst.

The catalyst may be chosen from virtually any suitable catalyst given the analyte of interest and due consideration to the reactions producing the electrons at the sensor 10. In some embodiments, the catalyst is selected from the group consisting of platinum, palladium, ruthenium, rhodium, nickel, gold, titanium, silver, copper, tin, zinc, lead, iridium, vanadium, cobalt, manganese, Iron, aluminum, and other metal based catalysts (metal oxides, metal chloride, etc), and combinations thereof.

The catalyst will be loaded at the anode at any suitable catalyst loading as generally known and practiced for a given analyte. The embodiments of the sensor disclosed herein advances the art by the implementation of variable catalyst loading at the cathode and anode and optimized micro-structure or nano-structure of electrodes and their catalyst layer(s) and different patterns for catalysts distribution on the catalyst layer. As will be described below, the sensor 10 is employed in an electrochemical analysis device 100 (FIG. 1), with ambient atmosphere at the cathode. With the oxygen of the ambient atmosphere generally being at significantly higher concentration than the analyte at the anode (e.g. 21 volume % $O_2$ in atmosphere), it has been found that the catalyst loading at the cathode can be significantly lower than at the anode and yet a sensor with good sensitivity and linearity of response can be achieved. This is termed herein "variable catalyst loading", wherein the amount of catalyst loaded at the anode is not the same as the amount loaded at the cathode. It is believed that this is a novel practice in PEMFC sensors.

In some embodiments, the catalyst is loaded by employing catalyst-on-carbon. For example, platinum on carbon (Pt/C) can be used, or rhodium on carbon, etc. Generally known and commercially available catalyst-on-carbon can be employed, or catalyst-on-carbon with a desired loading can be manufactured for use. Specific amounts of catalyst-on-carbon are shown herein through the proof of concept provided in the experimental section.

With the understanding that a variable loading of catalyst is possible in PEMFC sensors with the ability to produce acceptable sensor functioning, a series of sensors and experiments thereon can be developed to choose acceptable functioning sensors for a given application (i.e., given analyte).

In some embodiments, the catalyst is loaded to the anode using at from 5% or more to 100% or less catalyst-on-carbon (wherein 100% connotes pure catalyst without activated carbon support; for example, pure platinum back), loaded at from 0.1 or more to 5.0 or less mg/cm². In some embodiments, the catalyst is loaded at the cathode using at from 5% or more to 100% or less catalyst-on-carbon, loaded at from 0.01 to 4.0 mg/cm².

In some embodiments, the catalyst is loaded to the anode using at from 20% or more to 60% or less catalyst-on-carbon, loaded at from 0.2 to 0.4 mg/cm². In other embodiments, the catalyst is loaded to the anode using at from 30% or more to 50% or less catalyst-on-carbon, loaded at from 0.25 to 0.35 mg/cm². In some embodiments, the catalyst is loaded to the anode using at from 35% or more to 45% or less catalyst-on-carbon, loaded at from 0.25 to 0.35 mg/cm².

In some embodiments, the catalyst is loaded at the cathode using at from 5% or more to 30% or less catalyst-on-carbon, loaded at from 0.01 to 2 mg/cm². In some embodiments, the catalyst is loaded at the cathode using at from 10% or more to 30% or less catalyst-on-carbon, loaded at from 0.01 to 1 mg/cm². In some embodiments, the catalyst is loaded at the cathode using at from 15% or more to 25% or less catalyst-on-carbon, loaded at from 0.02 to 0.05 mg/cm².

In a some embodiments, the sensor senses ethanol as the analyte, and catalyst is loaded to the anode using at from 35% or more to 45% or less catalyst-on-carbon, loaded at from 0.25 to 0.35 mg/cm²; and the catalyst is loaded at the cathode using at from 15% or more to 25% or less catalyst-on-carbon, loaded at from 0.02 to 0.05 mg/cm². In a specific embodiment, the sensor senses ethanol, and catalyst is loaded to the anode using 40% catalyst-on-carbon, loaded at from 0.3 mg/cm²; and the catalyst is loaded at the cathode using 20% catalyst-on-carbon, loaded at 0.03 mg/cm².

In some embodiments, the amount of catalyst on the anode is ten times higher than the amount of catalyst on the cathode. In other embodiments, the amount of catalyst on the anode is twenty times higher than the amount of catalyst on the cathode.

The anode current collector 50 and the cathode current collector 60 are formed of any suitable electrically conductive material, such as stainless-steel, copper, aluminum, or gold for example. The anode and cathode current collectors 50, 60 include one or more ports or passages 70 that permit the flow of gas or liquid therethrough for interaction with respective anode and cathode layers 30, 40 that are directly adjacent thereto. In some embodiments, the anode and cathode current collectors 50, 60 may be formed as a mesh, or as any other gas/liquid porous material that is electrically conductive. For example, the mesh may comprise stainless-steel, such as 316 stainless steel.

The sensor 10 may be assembled using any suitable process. For example, in some embodiments, the electrolyte layer 20 and electrode layers 30,40 may be joined together to form the sensor 10 using a hot-press technique. However, in other embodiments, the electrolyte layer 20 and the electrode layers 30-40 of the sensor 10 may be maintained in operative communication with each other using mechanical compression, such as that provided by a clamp for example.

In some embodiments, the sensor 10 may be utilized in an electrochemical analysis device 100 for use in measuring, detecting and analyzing one or more properties an analyte or target gas or liquid, as shown in FIG. 1. For example, the electrochemical analysis device 100 may comprise a breathalyzer comprised to measure an ethanol concentration may be utilized for detection of any target gas/liquid concentration. The device 10 includes a chamber body 110, which includes a sealed cavity 120 that is in fluid communication with an inlet port 130 and an outlet port 140. The cavity 120 is dimensioned to receive the sensor 10 therein. The chamber body 110 may be formed of any suitable material, such as polymeric material or metal for example. The chamber body 110 may also include a cap 150 that is removably attached to the chamber body 110 to access the cavity 120 and to facilitate the ease at which the sensor 10 is inserted and removed from the cavity 120. The cavity 120 is also configured so that when the sensor 10 is inserted therein, the inlet port 130 is only in fluid communication with the anode layer 30, and the outlet 140 is only in fluid communication with the cathode layer 40. In other words, the cavity 120 is structurally configured to form 2 sub-chambers when the sensor 10 is inserted therein. As such, the inlet 130 and the cathode 40 fluidly communicate with one sub-chamber, while the outlet 140 and the anode 30 fluidly communicate with another sub-chamber. Thus, the sub-chambers function to separate gases/liquids flowing through the inlet 130 and the outlet 140 thereby preventing them from interacting with each other when interacting with the sensor 10. The chamber body 110 may also include any suitable ports to enable electrical leads or wires 200, 210 to pass therethrough for electrical communication, such as by way of direct electrical attachment, with each of the anode and cathode current collectors 50, 60 coupled to the sensor 10.

In order to identify a concentration of an analyte (i.e. a gas or liquid being tested or studied) using the sensor 10, the current collectors 50, 60 are placed in electrical communication with an electrical current detection device 250, which may comprise any suitable computing device, such as a portable or fixed computing device to monitor one or more parameters of the electrical current generated by the operation of the sensor 10, such as the magnitude of an electrical current that is generated from the sensor 10. However, in other embodiments, the detection device 250 may comprise a current sensor that includes the necessary circuitry to enable wired or wireless communication with a suitable computing device, such as a portable or standalone computing device.

In some embodiments, the electrochemical analysis device 100 may be formed as a self-contained device that includes both the chamber housing 110 and the electrical current detection device 250. Such a self-contained device may be configured as portable or fixed system.

The following discussion presents the operation of the sensor 10 when it is utilized as part of the electrochemical analysis device 100. Initially, a bias or oxidizing agent, such as a gas or liquid, including ambient air for example, is permitted to flow through the porous cathode current collector 60 to interact with the cathode layer 40. Additionally, the analyte or gas/liquid being analyzed is then permitted to flow through the porous anode current collector 50 to interact with the anode layer 30. The interaction of the analyte with the anode layer 30 results in a reaction with the catalyst, provided thereon, such as platinum (Pt) to produce free hydrogen atoms ($H^+$) and free electrons ($e^-$). Simultaneously, the bias or oxidizing agent is permitted to flow through the porous cathode current collector 60 to interact with the cathode layer 40. The interaction of the bias or oxidizing agent, such as ambient air, with the cathode layer 40 allows the free hydrogen atoms ($H^+$) that pass from the anode layer 30 and through the electrolyte layer 20 to combine with the $O_2$ of the ambient air of the oxidizing agent to form byproduct water ($H_2O$). In addition, the free electrons ($e^-$) generated at the anode layer 30, form an electrical current that flows to the anode current collector 50 into the external detection circuit 250, which is also electrically coupled to the cathode current collector 60. That is, upon the detection of an analyte gas or liquid that is compatible with the operation of the sensor 10, the anode layer 30 generates an electrical current that flows to the electrical current detection device 250 that is coupled between the anode and cathode current collectors 50, 60.

EXPERIMENTAL RESULTS

A.) PEMFC Sensor Fabrication

In order to assess the operational performance of the PEMFC sensor 10, the following parameters were studied through experimental analysis. The membrane electrode assembly (MEA) of PEMFC ethanol gas sensor 10 comprises a solid polymer electrolyte sandwiched by two electrodes. The electrodes are gas diffusion electrodes (GDE) comprised of Vulcan carbon-supported Pt catalyst (HiSpec 3000 and 4000, Alfa Aesarllohnson Matthey) and Nation ionomer spread on woven carbon cloth (GDL-CT, CeTech) as the gas diffusion layer (GDL). GDEs with 10, 20, 30, and 40% platinum (pt)/carbon (c) with a Pt loading of 0.1, 0.2, 0.25, and 0.3 mg/cm$^2$, respectively, were used as the electrodes of the sensor 10. The 10% Pt/C, 0.1 mg/cm$^2$ Pt and 30% Pt/C, 0.25 mg/cm$^2$ Pt GDEs were customized in this experiment with the exact same catalyst and GDL type with the other GDEs). The ratio of Nafion™ ionomer to Pt was held constant at 3:2 for all GDEs. The characteristics of a GDEs used in this study are listed in Table 1.

TABLE 1

Characteristics of different gas diffusion electrodes used in this study.

| Catalyst | Pt catalyst loading (mg/cm$^2$) | Thickness (μm) | | | | Pt in 1.8 cm$^2$ electrode (mg) |
|---|---|---|---|---|---|---|
| | | CL$^{(1)}$ | MPL$^{(2)}$ | GDL$^{(3)}$ | GDE$^{(4)}$ | |
| 10% Pt/C | 0.10 | 10 | 70 | 310 | 390 | 0.18 |
| 20% Pt/C | 0.20 | 10 | 70 | 310 | 390 | 0.36 |
| 30% Pt/C | 0.25 | 9 | 70 | 310 | 389 | 0.45 |
| 40% Pt/C | 0.30 | 8 | 70 | 310 | 388 | 0.54 |
| 20% Pt/C | 0.03 | 2 | 70 | 310 | 382 | 0.05 |
| Commercial sensor | 32 | 10 | Electrolyte thickness; 1 mm | | | 57.27$^{(5)}$ |

$^{(1)}$CL: catalyst layer
$^{(2)}$MPL: micro porous layer
$^{(3)}$GDL: gas diffusion layer
$^{(4)}$GDE: gas diffusion electrode (GDE = CL + MPL + GDL)
$^{(5)}$Commercial sensor electrode area was 1.21 cm$^2$. The amount of Pt loading for electrode area of 1.8 cm$^2$ was extrapolated.

Nafion™ 115 with the thickness of 127 μm (Fuel Cells Etc.) was used as the solid electrolyte membrane for fabrication of MEAs. Prior to fabrication, Nafion™ membrane requires impurity removal (cleaning) by the following steps: Nafion™ was immersed in boiling 3 wt % $H_2O_2$ aqueous solution for about 1 hour. Then, it was rinsed in de-ionized (DI) water several times, followed by boiling in DI water for 1 hour. The Nafion™ membrane cleaning was continued by immersing in boiling 1 M $H_2SO_4$ aqueous solution for about another hour. Finally, the Nafion™ membrane was rinsed several times with DI water and stored in DI water at room temperature prior to its usage in sensor fabrication. The electrodes and activated Nafion™ membranes were cut precisely by laser cutter machine (VLS2.30 Versa Laser) in a circular shape with the diameter of 15 mm (area is approximately 1.8 cm$^2$). It should be noted that Nafion™ membranes should be cut slightly larger than electrodes to prevent short-circuiting. Nafion™ 115 was then placed between two electrodes and was compressed using a hot press (MTI Corporation), which applied about 10 MPa (or 2.5 kN) of pressure at approximately 100° C. for about 1.5 minutes to complete the MEA fabrication. The fabricated MEA was then sandwiched between two current collectors (0.01 inch thick stainless steel metal grid, McMaster) to improve the current collection from the sensor's electrodes. In order to ensure good electrical contact between current collectors and electrodes and to minimize gas leakage from anode channel to cathode, the sensor chamber 110 was designed and printed by a high resolution 3D printing machine (Objet EDEN260V). The screw/bolt-fit chamber cap 150 was used to seal the sensor chamber cavity 120 and provide enough pressure on the sensor current collectors 50,60 to maintain a suitable electrical connection with the sensor 10 electrodes 30,40. FIG. 2 shows the manner in which the sensor 10 is positioned in the sensor chamber 120.

B.) Testing

Utilizing the PEMFC sensor 10 described in section A of the experimental results section above, various ethanol concentrations were applied thereto to evaluate the operational performance of the PEMFC sensor 10.

Sensors 10 with different Pt loadings were subjected to 10 different ethanol concentrations from 0.005 to 0.2% to investigate their electrochemical performance and linearity response versus the change of % ethanol. The sensors 10 were kept at room temperature during testing. After each test with certain ethanol concentrations, the sensor 10 was washed with pure DI water through the testing cycle for several times to remove remaining ethanol gas in tubes and housing. Removing the remaining ethanol from tubing and sensor electrodes 30,40 is essential since any remaining ethanol can interfere with the next run's current measurement.

C.) Results of Testing

Figure 3A:
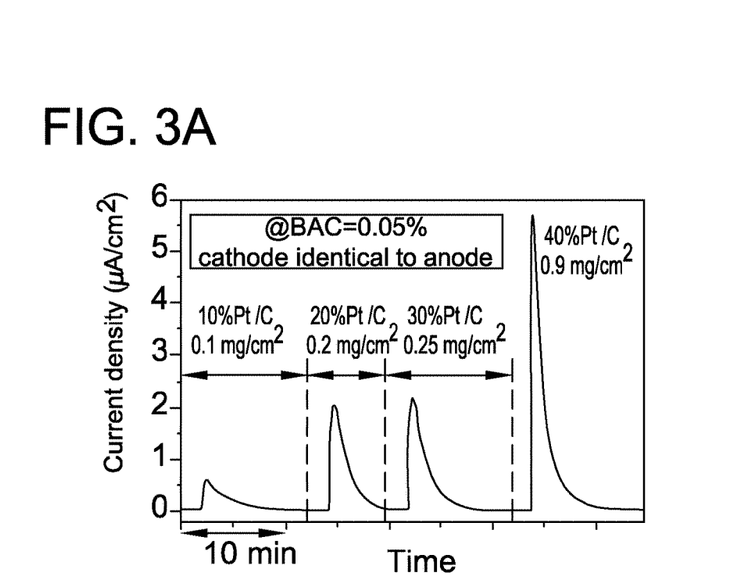
FIG. 3A is a graph showing a current density measurement of ethanol=0.05% using different Pt loadings on the electrodes of exemplary PEMFC sensors, whereby the results for various PEMFCs employing electrodes with identical catalyst loading are presented in accordance with the concepts of the various embodiments disclosed herein.
Figure 3B:
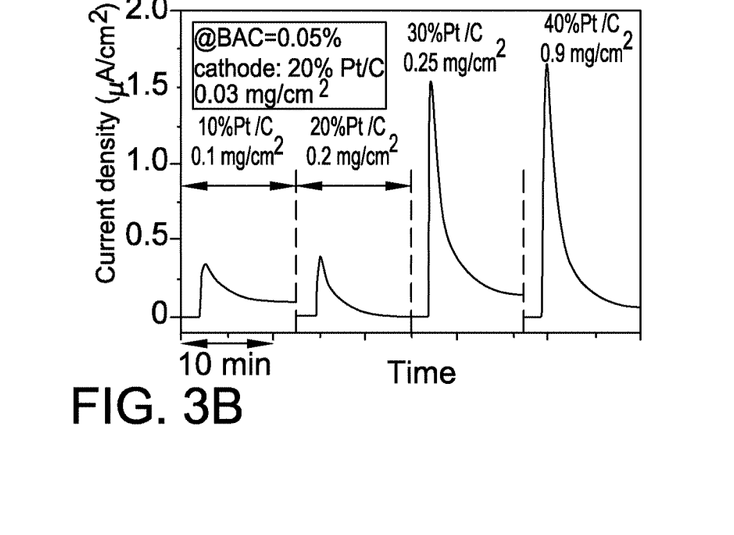
FIG. 3B is a graph showing the current density measurement of ethanol=0.05% using different Pt loadings on the electrodes of exemplary PEMFC sensors, whereby the results for various PEMFCs with electrodes with variable catalyst loading, i.e., with lower catalyst loading on the cathode as compared to the anode are presented in accordance with the various embodiments disclosed herein.
Figure 3C:
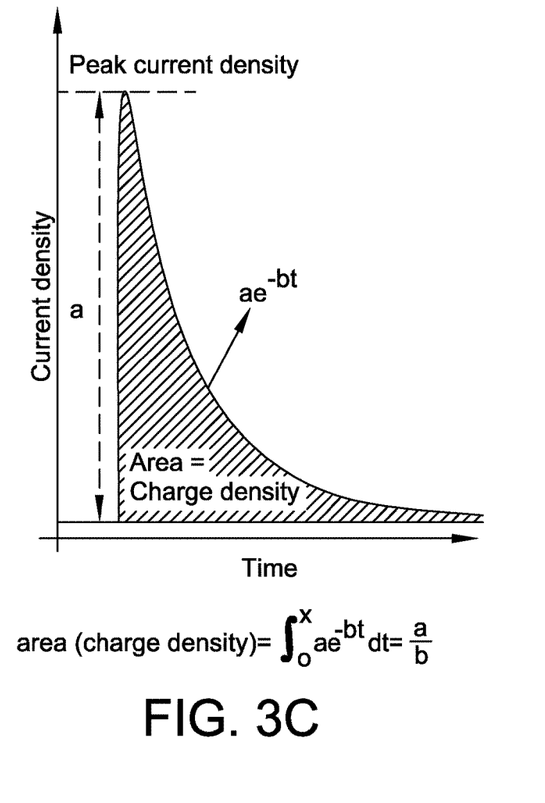
FIG. 3C is a graph showing the current density measurement of ethanol=0.05% using different Pt loadings on the electrodes of exemplary PEMFC sensors, whereby the concepts of peak time, decay/recover time, peak current and charge density (area underneath of current curve) are shown in accordance with the concepts of the various embodiments disclosed herein.

FIG. 3 shows the electrical current response of the sensors 10 with various electrode Pt loadings at the ethanol concentration of 0.05%. FIG. 3(a) demonstrates responses of identical electrode sensors. The term "identical electrode sensor" means the Pt loading for the anode and cathode of sensors 10 are exactly the same. FIG. 3(b) shares the same concept of FIG. 4(a) but has non-identical electrode sensors, where the cathode Pt loading is kept as low as 0.03 mg/cm$^2$ (20% Pt/C with 0.03 mg/cm$^2$ Pt). It should be noted that the same current test was accomplished for ten % ethanol concentration values but only the results of an ethanol concentration=0.05% are demonstrated in this Fig. As shown in FIG. 4(c), for all case studies when the ethanol-containing gas was injected into the sensor's anode compartment, the current across the external circuit was increased sharply in a very short time (peak time). It then fell rapidly down after reaching a peak and exhibited a sluggish decline towards the end of the cycle (decay/recovery time). The recovery curve exhibited exponential behavior as a exp(−bt). This equation can be applied to all fabricated sensors 10, where only a and b are changing by catalyst loading and % ethanol concentration. The peak electrical current and the area underneath the current response curve are also dependent on the Pt loading for the sensor electrodes 30,40 and % ethanol concentration.

Three different steps may be considered for current generation in a fuel cell sensor including (i) diffusion of $C_2H_5OH$ and $O_2$ into the electrodes catalysts, (ii) electrochemical reaction of $C_2H_5OH$ and $O_2$ on the anode and cathode active sites, and (iii) H+ diffusion in solid electrolyte polymer (Nafion™ 115). Ethanol gas is oxidized over the Pt catalyst at the anode (reaction 1), but Pt loading on the cathode side also plays a role in electrical current generation by the sensor 10, since oxygen reduction (reaction 2) takes place on the cathode side. Using the same anode Pt loadings, the sensors with low Pt loading on their cathode exhibited lower current densities than the sensors with high Pt cathode loading. Nevertheless, our investigations for current peaks obtained from identical sensors and non-identical sensors with very low Pt loading confirm that the value of peak current is reduced by less than 2 times on average if the catalyst loading is reduced significantly at the cathode 40.

Anodic reaction:

Cathodic reaction:

D.) Identical Electrode Sensors

FIG. 4 demonstrates the sensor 10 performance with identical Pt loading on their electrodes as a function of % ethanol concentration and examines the linearity response of different sensors 10 by altering the catalyst loading of the electrodes 30, 40. The peak current density of different catalyst loaded sensors is shown in FIG. 4(a). The increase of Pt/C loading from 10% to 40% raised the peak current densities, which was expected due to an increase in the catalyst loading on the electrodes. Increasing the catalyst loading increases the active sites resulting in activation polarizations reduction leading to an increase in generated current densities. In addition to the output current density magnitude and sensors response linearity, the sensitivity of the sensors 10 is another important factor for the characterization of the MEA. The sensor selectivity is obtained by the slope of calibration curves shown in FIG. 4(a). The current density sensitivity factors (slope of calibration curves) of identical electrode sensors were calculated by 8.51, 28.22, 41.36, and 67.64 uA/cm$^2$ for 10%, 20%, 30% and 40% Pt/C loaded electrodes, respectively. The trend of the sensitivity factors can be explained by the electrochemically active surface area (ECSA); the higher ECSA, the higher sensitivity. Although, it is reported that catalysts made from HiSpec 3000 (20% Pt/C) has higher mass specific activity than catalyst made from HiSpec 4000 (40% Pt/C) due to its smaller particle size but higher Pt loading in 40% Pt/C (0.2 mg/cm$^2$) than 20% Pt/C (0.3 mg/cm$^2$) led to a higher ECSA and sensitivity for 40% Pt/C (0.2 mg/cm$^2$) catalyst.

Figure 4A:
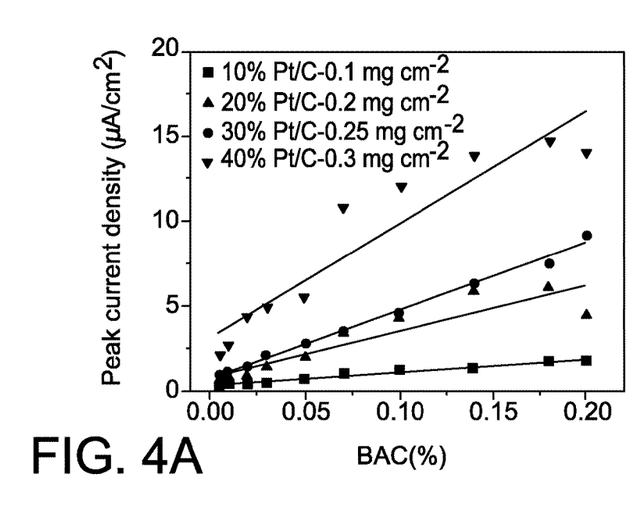
FIG. 4A is a graph showing the performance of PEMFC sensors with identical Pt loading on electrodes as a function of % BAC (i.e. ethanol) and their linearity response, whereby peak current density of sensors with different Pt loading is presented in accordance with the concepts of the various embodiments disclosed herein.
Figure 4B:
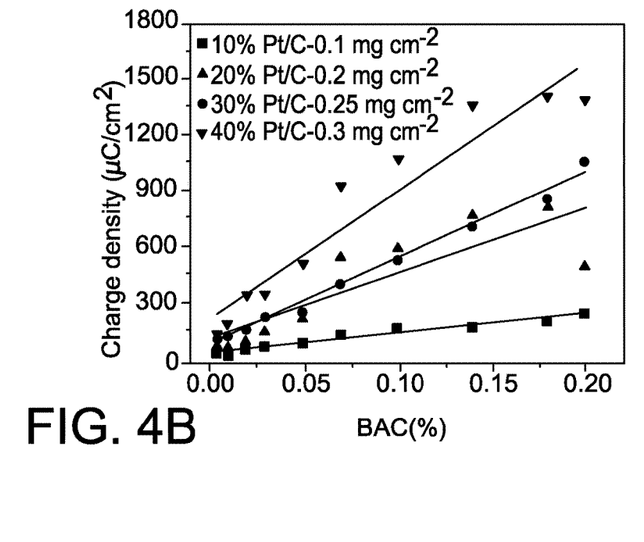
FIG. 4B is a graph showing the performance of PEMFC sensors with identical Pt loading on electrodes as a function of % BAC (i.e. ethanol) and their linearity response, whereby the charge density of sensors with different Pt loading is presented in accordance with the concepts of the various embodiments disclosed here.
Figure 4C:
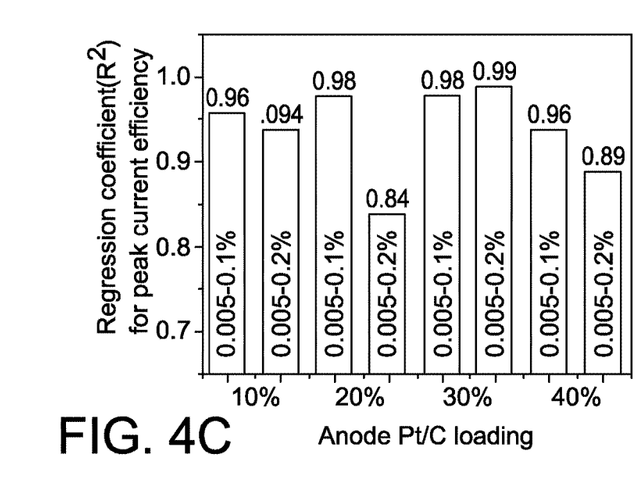
FIG. 4C is a graph showing the performance of PEMFC sensors with identical Pt loading on electrodes as a function of % BAC (i.e. ethanol) and their linearity response, whereby regression coefficients of peak current densities for sensors operating from BAC 0.005-0.1% and 0.005-0.2% are presented in accordance with the concepts of the various embodiments disclosed herein.
Figure 4D:
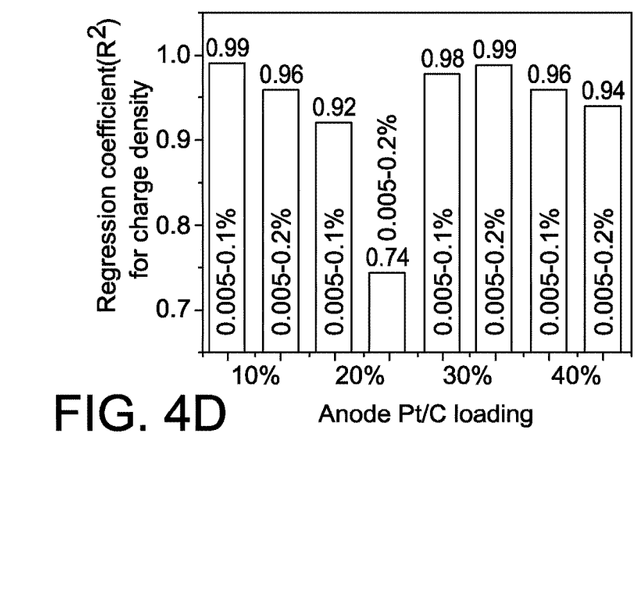
FIG. 4 is a graph showing the performance of PEMFC sensors with identical Pt loadings on electrodes as a function of % BAC (i.e. ethanol) and their linearity response, whereby regression coefficients of charge densities for sensors operating from BAC 0.005-0.1% and 0.005-0.2% are presented in accordance with the concepts of the various embodiments disclosed herein.

FIG. 4(b) demonstrates the changes in the area under the current response curves, which represents the charge density. The charge density sensitivity factors of identical sensors with 10%, 20%, 30% and 40% Pt/C loaded electrodes are calculated by 1143.6, 3611.4, 4740.6, and 7057.8 uC/cm$^2$, respectively. It is believed that the area under the curve may represent the ethanol concentration in the feed more accurately than by using the peak current value. In this study, the sensitivity, and peak current and charge densities follow the same trend, which shows the highest sensitivity, current and charge densities for 40% Pt/C and the lowest ones for 10% Pt/C loading. The regression least square coefficient (R2) shown in FIGS. 4(c) and (d) show that all of the sensors 10 with different Pt loadings had acceptable linear response toward changing ethanol concentration from ethanol concentration of 0.005 to 0.2%. The sensor with 20% Pt/C and 0.2 mg/cm$^2$ loading only showed poor linearity at ethanol concentration between 0.005 to 0.1% and did not perform as good as other sensors across the full range of ethanol concentration. The best linearity was obtained from the sensor with 30% Pt/C and 0.25 mg/cm$^2$ loading, revealing more than 99% linearity. Since obtaining the peak current density is faster than the charge density, employing the peak current density method for these sensors to measure the ethanol concentration is preferred. Thus, the sensor is able to recover for the next use at a faster rate. It was discovered that the measurement accuracy would not be changed if the peak current method is used instead of charge density to measure the ethanol gas concentration for a fresh sensor operating at room temperature.

E.) Non-Identical Electrode Sensors

Ethanol oxidation and hydrogen ion generation take place on the anode side of the sensor. Since the ethanol concentration of the feed or oxidant gas is in the range of parts-per-million (ppm), the catalyst loading on the anode 30 should be high enough to guarantee the occurrence of ethanol oxidation and sensor 10 functioning. Alternatively, the oxygen concentration in air is 21 vol. %, which is significantly higher than the ethanol concentration in the anode 30. Therefore, the Pt loading on the cathode 40 can be potentially lower than the anode 30. Thus, the fabrication of the sensors 10 with lower Pt loading on cathode 40 can be economically favorable, especially in mass production of the sensor 10, without having any crucial or significant effect on the sensor's performance. FIG. 5 demonstrates the sensors' performances with non-identical electrode 30,40 Pt loadings (low Pt loading: 20% Pt/C-0.03 mg/cm$^2$ on the cathode 40) as the function of % ethanol concentration and examines the current response and linearity of different sensors by altering the anode catalyst loading.

Figure 5A:
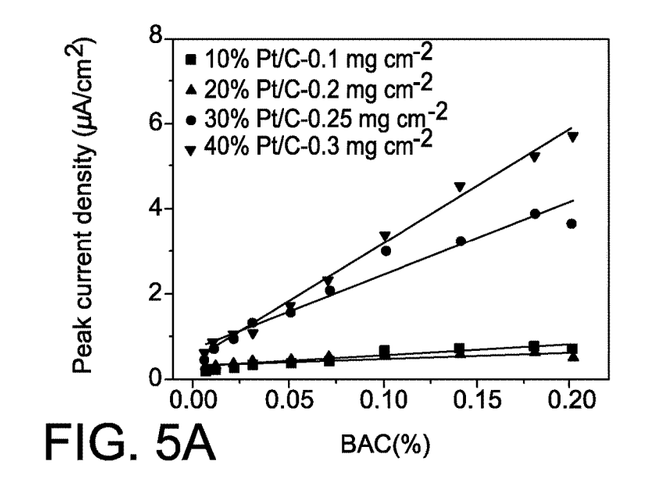
FIG. 5A is a graph showing the performance of PEMFC sensors with variable catalyst loading, whereby a low Pt loaded cathode (20% Pt/C-0.03 mg/cm$^2$) is presented as a function of % BAC along with their linearity response, whereby peak current density of sensors with different anode Pt loadings are presented in accordance with the concepts of the various embodiments disclosed herein.
Figure 5B:
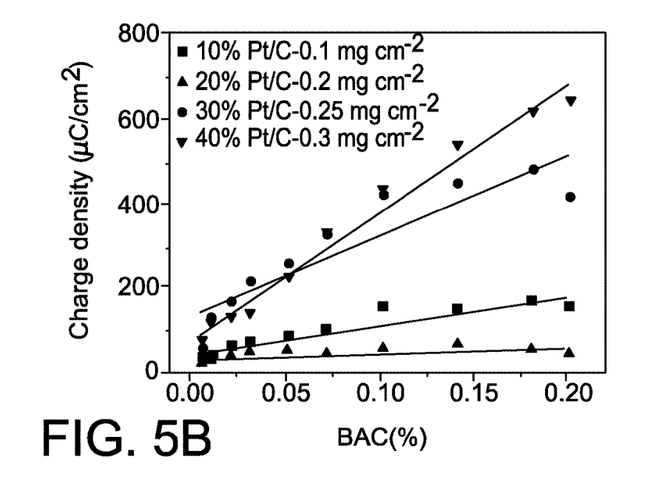
FIG. 5B is a graph showing the performance of PEMFC sensors with variable catalyst loading, whereby a low Pt loaded cathode (20% Pt/C-0.03 mg/cm$^2$) is presented as a function of % BAC along with their linearity response, whereby the charge density of sensors with different anode Pt loading are presented in accordance with the concepts of the various embodiments disclosed herein.
Figure 5C:
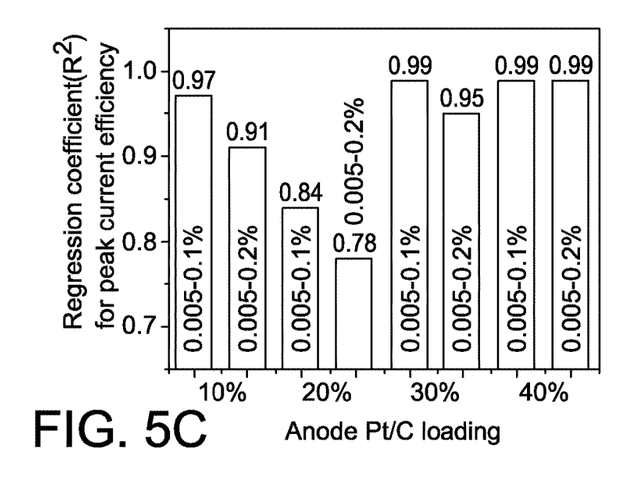
FIG. 5C is a graph showing the performance of PEMFC sensors with variable catalyst loading, whereby low Pt loaded cathode (20% Pt/C-0.03 mg/cm$^2$) is presented as a function of % BAC along with their linearity response, whereby regression coefficients of peak current densities for sensors operating from BAC 0.005-0.1% and 0.005-0.2% are presented in accordance with the concepts of the various embodiments disclosed herein.
Figure 5D:
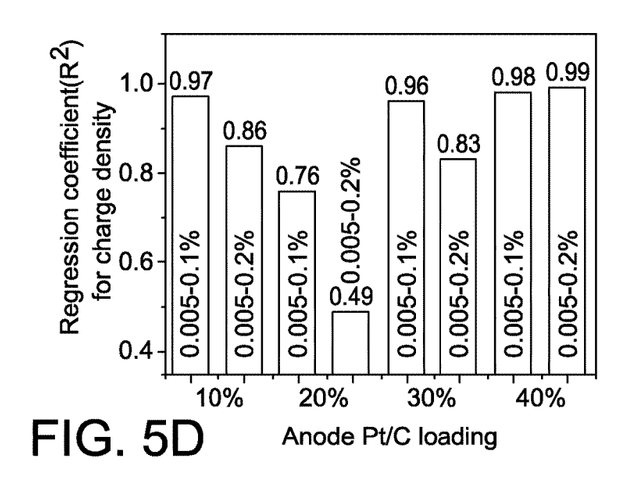
FIG. 5D is a graph showing regression coefficient of charge densities for sensors operating from BAC 0.005-0.1% and 0.005-0.2% are presented in accordance with the concepts of the various embodiments disclosed herein.

The peak current densities shown in FIG. 5(a) reveal that the trend of current generation of sensors with non-identical anode loading is similar to identical electrode sensors. The current density sensitivity factor of non-identical electrode sensors were calculated by 3.36, 2.17, 18.04, and 27.51) mA/cm$^2$ for 10%, 20%, 30% and 40% Pt/C anode loadings, respectively. The sensor with 40% Pt/C and 0.3 mg/cm$^2$/ loading on the anode side showed the highest sensitivity and peak current density. FIG. 5(b) shows that the charge density also follows the linear behavior by increasing the ethanol concentration (% BAC). The charge density sensitivity factor of this kind of sensors were calculated by 711.0, 181.8, 1959.6, and 3087.0 mA/cm$^2$ for 10%, 20%, 30% and 40% Pt/C anode loadings, respectively. The calculated least square coefficient (R$^2$) demonstrated in FIGS. 5(c) and 5(d) shows that the sensors with low Pt loading on the cathode have a good linearity response. Only the sensor with 20% Pt/C and 0.2 mg/cm$^2$ anode loading deviated from linear behavior. The R$^2$ values for both peak current and charge densities are high.

F.) Commercial Sensor

FIG. 6 illustrates a commercial ethanol gas sensor's performance as a function of % ethanol concentration. The commercial sensor employs very thick porous polyvinyl chloride (PVC) membrane that is loaded with liquid acid electrolyte with two thin (10 μm) identical Pt electrodes (32 mg/cm$^2$ Pt). The commercial sensor was tested in the same cell hardware with the fabricated sensors in this study. FIGS. 6(a) and 6 (b) demonstrate the peak current density and charge density generated by this sensor, respectively. The sensitivity factor of commercial sensor for current density and charge density were calculated by 213.85 mA/cm$^2$ and 27814.2 μC/cm$^2$, respectively. Comparison of the magnitude of sensitivity factors, peak current and charge densities of the commercial sensor and the fabricated sensors in the lab revealed that the commercial sensor generates up to one order of magnitude higher sensitivity, current and charge densities than the sensors developed in lab. High sensitivity, current and charge densities of the commercial sensor are expected due to extremely high loading of Pt catalyst on its electrodes. Although the generated current density of the commercial sensor is greater than the fabricated sensors in lab, the majority

TABLE 2

Comparison of best fabricated sensors in lab with a commercial sensor.

| | Pt loading (mg/cm$^2$) | | Peak current density at | Current density | Regression coefficient (R$^2$) for peak current density at BAC ranges of | | Pt used per |
|---|---|---|---|---|---|---|---|
| Sensor category | Anode | Cathode | BAC 0.05% (μA/cm$^2$) | sensitivity | 0.005-0.1% | 0.005-0.2% | sensor (mg) |
| Identical electrode | 0.25 | 0.25 | 2.2 | 41.36 | 0.98 | 0.99 | 0.90 |
| Non-identical electrode | 0.30 | 0.03 | 1.7 | 27.51 | 0.99 | 0.99 | 0.60 |
| Commercial | 32 | 32 | 13.7 | 213.85 | 0.93 | 0.99 | 77 | of the fabricated sensors exhibited slightly better linearity with changing % BAC, especially in an ethanol concentration range of 0.005-0.1%, see Table 2.

Figure 6A:
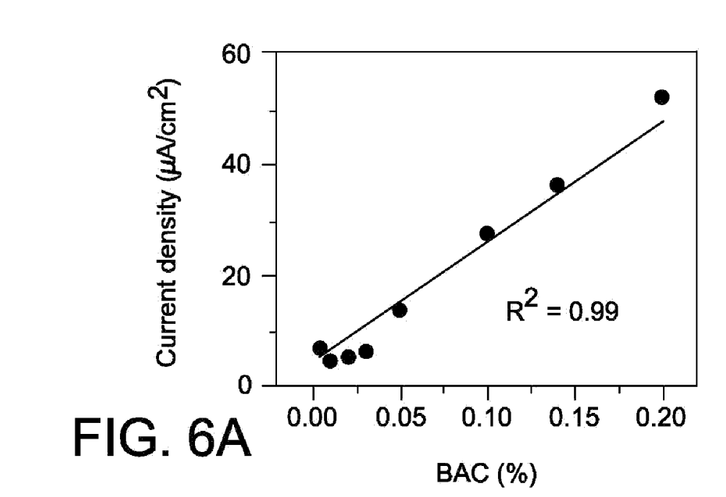
FIG. 6A is a graph showing the performance of a commercial alcohol sensor as a function of % BAC and its linearity response, whereby the peak current density is also presented in accordance with the concepts of the various embodiments disclosed herein.
Figure 6B:
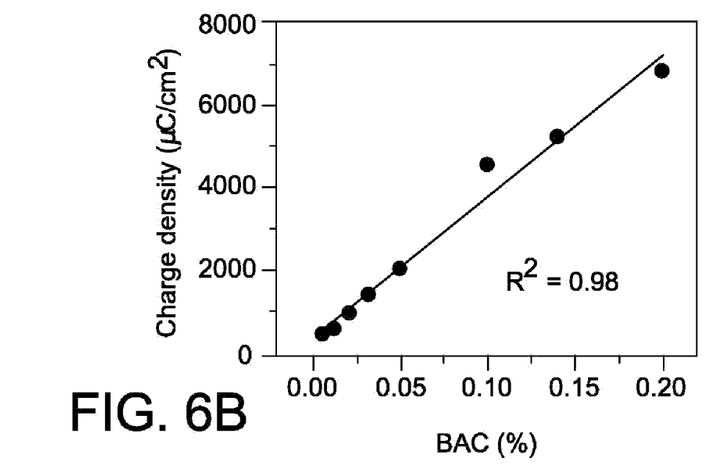
FIG. 6B is a graph showing the performance of a commercial alcohol sensor as a function of % BAC and its linearity response, whereby charge density is also presented in accordance with the concepts of the various embodiments disclosed herein.
Figure 6C:
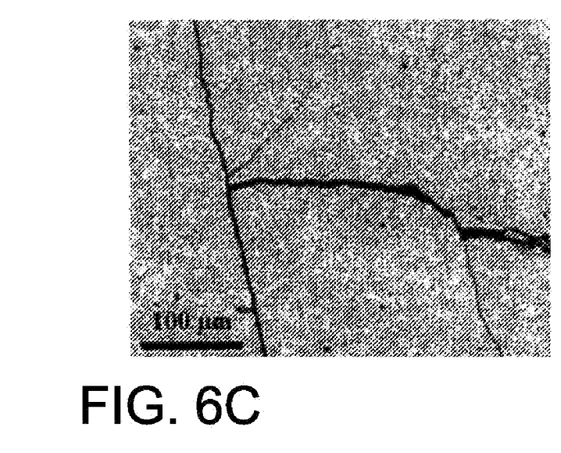
FIG. 6C is a graph showing the performance of a commercial alcohol sensor as a function of % BAC and its linearity response, whereby an SEM micrograph (magnification: ×500) is also presented in accordance with the concepts of the various embodiments disclosed herein.
Figure 6D:
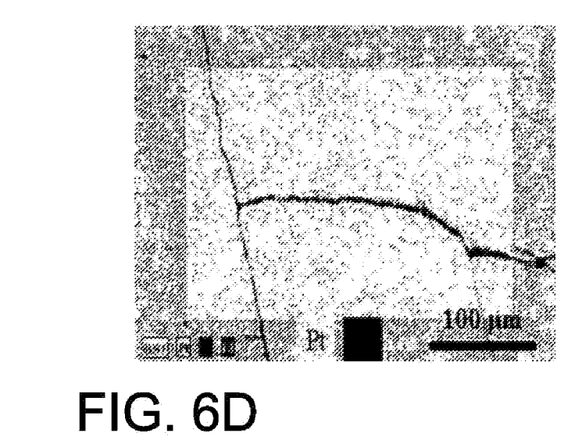
FIG. 6D is a graph showing the performance of a commercial alcohol sensor as a function of % BAC and its linearity response, whereby an energy-dispersive X-ray spectroscopy (EDS) analysis is also presented in accordance with the concepts of the various embodiments disclosed herein.

FIG. 6(c) shows the SEM micrograph of the commercial sensor with the same magnification as the fabricated sensors in lab. The EDS analysis of the commercial sensor electrode illustrated in FIG. 6(d) confirms that almost 100 wt % of the electrode is Pt catalyst. In order to compare the developed sensors with the commercial one, the best performing sensor from each category (i.e. identical electrode and non-identical electrode) was selected and listed in Table 2 along with the commercial sensor characteristics.

Figure 7:
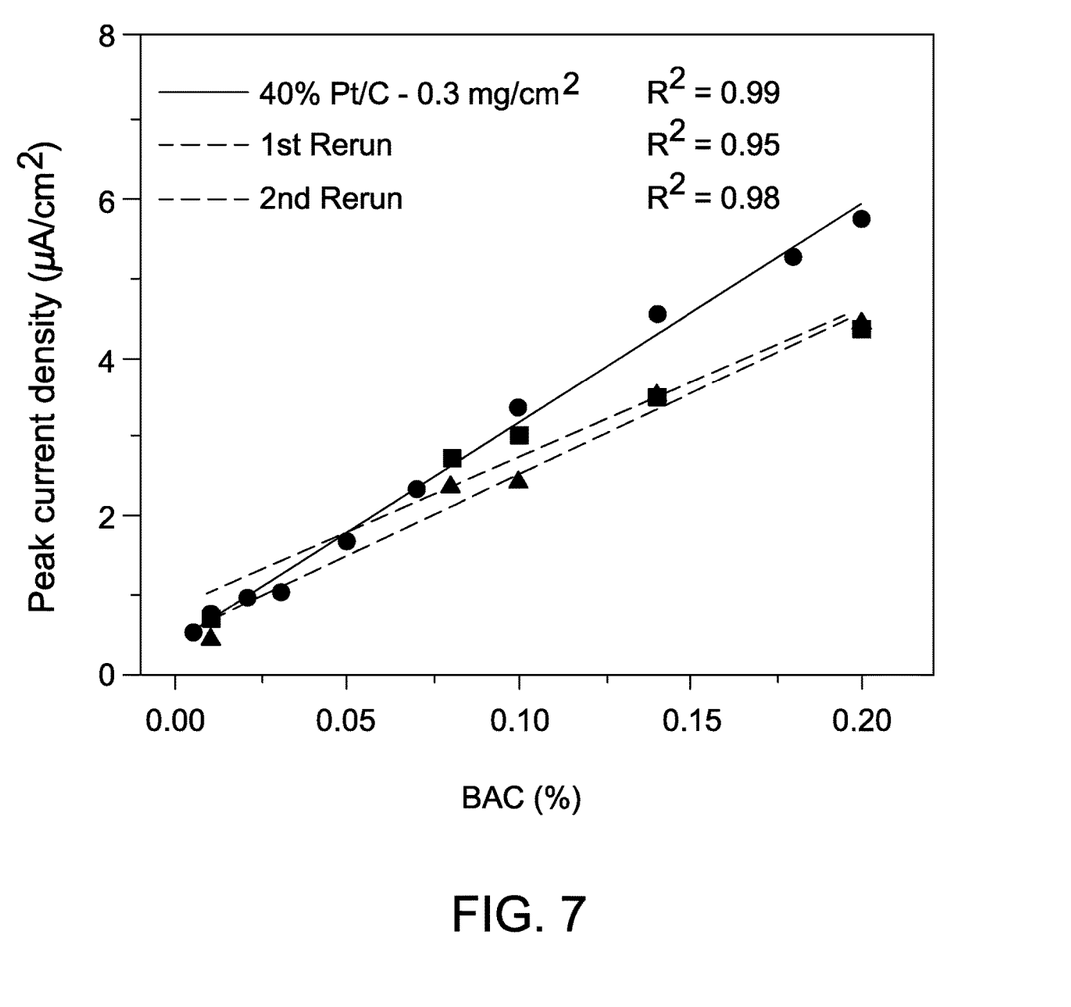
FIG. 7 shows the repeatability analysis of the best developed sensor (i.e. 40% Pt/C-0.30 mg cm-2 anode and 20% Pt/C-0.03 mg cm-2 cathode), wherein the solid line is the fresh sensor testing, and the dash lines represent test runs after the sensor sat idle for 2 months in the lab.

The criteria for selecting the best sensor was a combination of the amount of Pt loading, linearity, sensitivity and magnitude of the current density generation of the sensor. Table 2 indicates that the best sensor is the one with 40% Pt/C-0.30 mg/cm$^2$ anode and 20% Pt/C-0.03 mg/cm$^2$ cathode, since it has the highest linearity response, the lowest Pt loading and acceptable sensitivity. The amount of Pt used in the commercial sensor is more than 130 times higher than that in this sensor. In addition, this sensor has 67% less Pt catalyst compared to a PEMFC sensor fabricated and tested by Kim, et. al. The advantages of the commercial sensor over fabricated sensors are its higher sensitivity and higher current density generation plus probably its stability. The latter is not the scope of this study and it is an ongoing study in our lab. Thus, a more accurate current reading electronic circuit may be required for the low catalyst loading sensor fabricated in lab. FIG. 7 illustrates the study for durability and repeatability of the best developed sensor. The durability runs were completed after 2 months of the sensor 10 sitting idle in a lab environment. Getting almost similar results from the sensor after 2 months shows that the sensor was durable and its Nafion™ membrane was still active and could preserve its moisture. Rerunning the sensor for 2 extra times indicated that results are repeatable, and the sensor could keep its accuracy for all repeated runs.

A recent study using power-generating fuel cell electrode material as breath alcohol sensor with 20% Pt/C and Pt loading of 0.4 mg/cm$^2$ showed 97% less Pt usage compared to the commercial sensor. However, in our study we developed the sensor with non-identical Pt loading electrodes which lead to the use of 100-130 times less Pt loading than commercial sensor due to applying cathodes with extremely low amount of Pt loading. Subsequently, we depict that with this lower amount of Pt loading, sensitivity and linearity of the results are still reliable as a breath alcohol sensor.

G). Conclusion

Solid polymer electrolyte fuel cell sensors with different Pt catalyst loading on (i.e. electrodes were fabricated to measure the ethanol gas concentration in exhaled human breath. The sensitivity, peak current density and charge density for two types of sensors 10 including (i) identical electrode sensors, and (ii) non-identical electrode sensors were measured. The results revealed that the GDE with 40% Pt/C-0.3 mg/cm$^2$ loading has the highest sensitivity factor, peak current and charge densities of all types of the sensors studied. The least square coefficients ($R^2$) for almost all of the two types of sensors were found to be acceptable for detecting ethanol concentration with very good accuracy in the ethanol concentration range of 0.005 to 0.2%. The $R^2$ values for peak current densities were as high as the charge densities. Thus, using the peak current density measurement method is desirable in some cases over the charge density measurement method since the latter takes more time for completion of the sensor reading. Utilizing a low Pt containing cathode 40 did not have a significant adverse effect on the performance of sensor 10, indicating that this type of sensor is more cost-effective than other types without losing accuracy. Comparison of the performance of the commercial sensor with the fabricated low catalyst loading sensors 10 indicates that sensors 10 are significantly less costly and operate more linearly in a wider range of % ethanol concentration. Considering the merits of a fuel cell sensor 10 (i.e. sensitivity, high current generation, high linearity response in wide range of % ethanol concentrations, and low production cost), the sensor 10 with anode 30 loading of 40% Pt/C-0.3 mg/cm$^2$ and cathode 40 loading of 20% Pt/C-0.03 mg/cm$^2$ is the most desirable. This sensor 10 requires 130 times lower Pt loading compared to the commercial sensor, and 67% less Pt loading as compared to the PEMFC sensor studied by other researchers for ethanol gas measurement.

Using catalyst as low as 40% Pt/C-0.3 mg/cm$^2$ for anode and 20% Pt/C-0.03 mg/cm$^2$ for cathode has high sensitivity to breath alcohol content. Using catalyst as low as 40% Pt/C-0.3 mg/cm$^2$ for anode and 20% Pt/C-0.03 mg/cm$^2$ for cathode has relatively high current generation for wide range of % BAC from 0.005% to 0.2%. Using catalyst as low as 40% Pt/C-0.3 mg/cm$^2$ for anode and 20% Pt/C-0.03 mg/cm$^2$ for cathode has highly linear response for wide range of % BAC from 0.05% to 0.2%. High accuracy and linearity of current density response to alcohol content is an enabler for using peak current density instead of charge density for alcohol content measurement, and asymmetric loading results in a sensor with fast response times.

What is claimed is:

1. A polymer electrolyte membrane fuel cell (PEMFC) sensor to detect an analyte comprising:
    an anode;
    a cathode configured to react with air; and
    a polymer electrolyte disposed between said anode and cathode,
    wherein said anode and cathode have a variable loading of a catalyst thereon, wherein said variable loading of said catalyst comprises an amount of said catalyst on said cathode that is less than an amount of said catalyst on said anode.

2. The PEMFC sensor of claim 1, further comprising:
    a first current collector in electrical communication with said cathode; and
    a second current collector in electrical communication with said anode,
    wherein said first and second current collectors are porous.

3. The PEMFC sensor of claim 2, further comprising a current sensor in operative communication with said first and second current collectors.

4. The PEMFC sensor of claim 1, wherein said catalyst is platinum (Pt).

5. The PEMFC sensor of claim 4, wherein said catalyst is disposed on a porous carbon (C) substrate.

6. The polymer electrolyte membrane fuel cell (PEMFC) sensor of claim 1, wherein loading of said catalyst on said anode is from 0.1 mg/cm$^2$ to 5.0 mg/cm$^2$ and loading of said catalyst on said cathode is from 0.01 mg/cm$^2$ to 4.0 mg/cm$^2$.

7. The polymer electrolyte membrane fuel cell (PEMFC) sensor of claim 1, wherein loading of said catalyst on said anode is from 0.2 mg/cm$^2$ to 0.4 mg/cm$^2$.

8. The polymer electrolyte membrane fuel cell (PEMFC) sensor of claim 1, wherein loading of said catalyst on said cathode is from 0.01 mg/cm$^2$ to 2 mg/cm$^2$.

9. The polymer electrolyte membrane fuel cell (PEMFC) sensor of claim 1, wherein loading of said catalyst on said anode is from 0.2 mg/cm$^2$ to 0.4 mg/cm$^2$ and wherein loading of said catalyst on said cathode is from 0.01 mg/cm$^2$ to 2 mg/cm$^2$.

10. The polymer electrolyte membrane fuel cell (PEMFC) sensor of claim 1, wherein the analyte detected is ethanol, and wherein the loading of said catalyst on said anode is from 0.25 mg/cm$^2$ to 0.35 mg/cm$^2$ and loading of said catalyst on said cathode is from 0.02 mg/cm$^2$ to 0.05 mg/cm$^2$.

11. The polymer electrolyte membrane fuel cell (PEMFC) sensor of claim 1, wherein loading of said catalyst on said anode is 10 times to 20 times the loading of said catalyst on said cathode.

12. An electrochemical sensing device including said PEMFC sensor of claim 1, wherein said electrochemical sensing device further includes:
   a chamber body having a cavity disposed therein;
   a first port in communication with said cavity, said first port configured to receive the air therethrough; and
   a second port in communication with said cavity, said second port configured to receive the analyte therethrough;
   wherein said PEMFC is positioned within said cavity, such that the air and the analyte are separated within said cavity.

13. A method of forming a polymer electrolyte membrane fuel cell (PEMFC) sensor to detect an analyte comprising:
   providing an electrolyte, an anode, and a cathode, wherein said anode and said cathode have a variable loading of catalyst thereon and wherein said variable loading of said catalyst comprises an amount of said catalyst on said cathode that is less than an amount of said catalyst on said anode; and
   hot pressing said electrolyte, said anode and said cathode together to form the PEMFC sensor.

14. The method of claim 13, further comprising:
   loading catalyst on said anode in an amount of 0.1 mg/cm$^2$ to 5.0 mg/cm$^2$; and
   loading catalyst on said cathode in an amount of 0.01 mg/cm$^2$ to 4.0 mg/cm$^2$.

* * * * *